(12) United States Patent
Calahan et al.

(10) Patent No.: US 8,819,081 B2
(45) Date of Patent: Aug. 26, 2014

(54) SYSTEM, METHOD AND COMPUTER PROGRAM PRODUCT FOR RULE-BASED PERFORMANCE OF ACTIONS ON RELATED OBJECTS

(75) Inventors: Patrick Calahan, San Francisco, CA (US); Shilpa Goel, San Jose, CA (US); George Hart, San Francisco, CA (US); Varadarajan Rajaram, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/065,915

(22) Filed: Mar. 31, 2011

(65) Prior Publication Data

US 2011/0246533 A1      Oct. 6, 2011

Related U.S. Application Data

(60) Provisional application No. 61/319,783, filed on Mar. 31, 2010.

(51) Int. Cl.
*G06F 17/30* (2006.01)
(52) U.S. Cl.
USPC .......................................... 707/803; 707/805
(58) Field of Classification Search
USPC .......................................... 707/694, 805, 803
See application file for complete search history.

(56) References Cited

U.S. PATENT DOCUMENTS

| | | | |
|---|---|---|---|
| 6,098,075 A * | 8/2000 | Becraft et al. ........................ 1/1 |
| 7,209,929 B2 | 4/2007 | Dominguez, Jr. et al. |
| 7,698,160 B2 | 4/2010 | Beaven et al. |
| 7,787,390 B1 * | 8/2010 | Orr ............................... 370/252 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2003/0233404 A1 | 12/2003 | Hopkins |
| 2005/0034071 A1 * | 2/2005 | Musgrove et al. ............. 715/530 |
| 2005/0065925 A1 | 3/2005 | Weissman et al. |
| 2005/0223022 A1 | 10/2005 | Weissman et al. |
| 2005/0283478 A1 | 12/2005 | Choi et al. |
| 2006/0031491 A1 * | 2/2006 | Nielsen et al. ................. 709/225 |
| 2006/0206834 A1 | 9/2006 | Fisher et al. |
| 2010/0150449 A1 * | 6/2010 | Laksono ........................ 382/190 |

OTHER PUBLICATIONS

U.S. Appl. No. 60/828,192, filed Oct. 4, 2006.

* cited by examiner

*Primary Examiner* — Etienne Leroux
*Assistant Examiner* — Fariborz Khoshnoodi
(74) *Attorney, Agent, or Firm* — Zilka-Kotab, PC

(57) ABSTRACT

In accordance with embodiments, there are provided mechanisms and methods for rule-based performance of actions on related objects. These mechanisms and methods for rule-based performance of actions on related objects can provide a generalized technique for configuring related object actions that are responsive to object updates. The ability to provide this generalized technique can enable actions to be automatically performed on objects in response to updates to related objects, in a rule-based manner.

23 Claims, 7 Drawing Sheets

SYSTEM, METHOD AND COMPUTER PROGRAM PRODUCT FOR RULE-BASED PERFORMANCE OF ACTIONS ON RELATED OBJECTS

CLAIM OF PRIORITY

This application claims the benefit of U.S. Provisional Patent Application 61/319,783 entitled "Cross Object Workflows," by Calahan et al., filed Mar. 31, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to relationships between objects in a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, objects stored by such database system may be related. For example, one object may reference another object (e.g. as a child of that other object, etc.). Thus, when one object is updated, it is oftentimes desired for its related objects to also be updated, or for some other action to be performed with respect to such related objects. Unfortunately, techniques for performing actions on objects as a response to updates to related objects have been limited.

In the past, related object actions have generally been incapable of being performed by way of the object being updated. In very limited circumstances, the related object actions have been implemented by manually coding separate functionality for each object. However, when numerous objects exist, it has been infeasible to provide such manual coding for each object, and updating of the manually generated code to change related object actions, etc. has required tedious manual work.

Accordingly, it is desirable to provide techniques enabling a generalized technique for configuring related object actions that are responsive to object updates to improve the functionality and ease of use of the database system.

BRIEF SUMMARY

In accordance with embodiments, there are provided mechanisms and methods for rule-based performance of actions on related objects. These mechanisms and methods for rule-based performance of actions on related objects can enable embodiments to provide a generalized technique for configuring related object actions that are responsive to object updates. The ability of embodiments to provide this generalized technique can enable actions to be automatically performed on objects in response to updates to related objects, in a rule-based manner.

In an embodiment and by way of example, a method for rule-based performance of actions on related objects is provided. In use, a first action performed in association with a first object is identified. Additionally, at least one rule associated with the first object is evaluated, based on the first action. Further, at least one second action associated with at least one second object related to the first object is conditionally performed, based on the evaluation of the at least one rule.

While one or more implementations and techniques are described with reference to an embodiment in which rule-based performance of actions on related objects is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for rule-based performance of actions on related objects.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing rule-based performance of actions on related objects will be described with reference to example embodiments.

Figure 1:
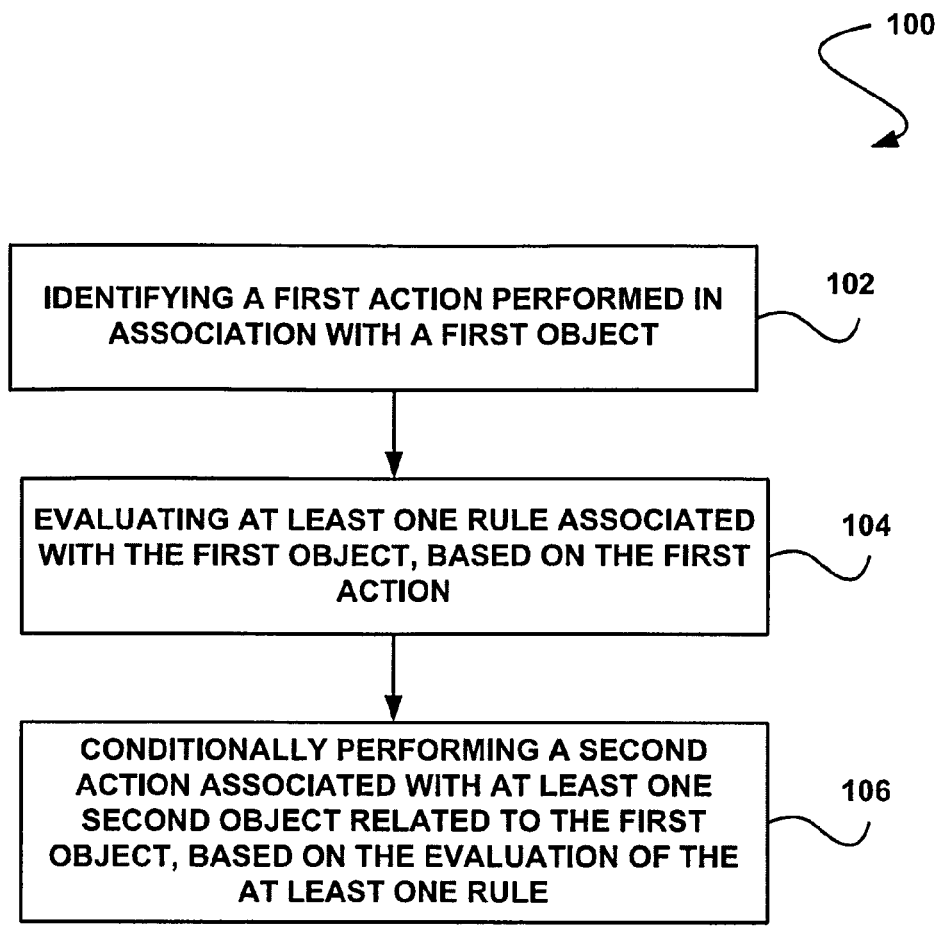
FIG. 1 illustrates a method for rule-based performance of actions on related objects, in accordance with an embodiment.

FIG. 1 illustrates a method 100 for rule-based performance of actions on related objects, in accordance with an embodiment. As shown in operation 102, a first action performed in association with a first object is identified. In the context of the present description, an object may include any object represented by code in a computer system. For example, an object may include a database object (e.g. a row of a database).

As an option, the database may be of a multi-tenant on-demand database system. Thus, the object may be associated with a tenant of the multi-tenant on-demand database system. For example, the object may be stored by the tenant, created by the tenant, etc.

In one embodiment, the first action may include creating the first object. In another embodiment, the first action may include deleting the first object. In yet another embodiment, the first action may include an update to the first object, such as any modification to the first object. Accordingly, the update may include adding data to the first object, removing data from the first object, changing data stored by the first object, etc. In the above example where the first object is a row of a database (i.e. of a database table), the update may include a modification to a field of the first object, such as a modification to data stored in the field.

Additionally, as shown in operation 104, at least one rule associated with the first object is evaluated, based on the first action. The rule may include any data capable of being evaluated with respect to the first action. In one embodiment, the rule may include an expression. For example, the rule may have an identifier of a field, at least one operator, and at least one value, such that a value of the field may be evaluated using the operator with respect to the value included in the rule.

In this way, the rule may be capable of being evaluated to true or false, in one embodiment. In particular, evaluating the rule may include determining whether a condition of the rule is met. For example, if the value of the field meets the condition specified by the operator and the value included in the rule, then the rule may be evaluated to true. As another example, if the value of the field does not meet the condition specified by the operator and the value included in the rule, then the rule may be evaluated to false.

As an option, the rule may be associated with the first object by being configured for the first object. For example, the rule may be configured by a user (e.g. a tenant associated with the object). Such rule may be configured using a GUI (e.g. the GUIs described below with respect to FIGS. 4A-C).

Of course, the rule may also be stored in association with the first object (e.g. referencing the object), or associated with the first object in any other manner.

As noted above, at least one rule is evaluated. In one embodiment, all rules associated with the first object may be evaluated. In another embodiment, only rules that are specific to a field of the first object that is associated with the first action (e.g. which have an identifier of the updated field of the first object) may be evaluated. With respect to such embodiment, only rules applicable to the acted upon portion of the first object may be evaluated.

Moreover, the rule may be evaluated based on the first action in any manner. In one embodiment, the rule may be evaluated automatically in response to the first action. For example, the rule may be evaluated upon a user saving a modification made to the first object.

Further, at least one second action associated with at least one second object related to the first object is conditionally performed, based on the evaluation of the at least one rule. Note operation 106. In the context of the present description, the second object may include any object other than the first object, but which is related to the first object. Thus, the second object may be stored in the same database as the first object, as an option.

In one embodiment, the relationship between the first object and the second object may be established via a reference to the second object that is stored by the first object, or vice versa. For example, the second object may be related to the first object by virtue of the second object being referenced by the first object. As an option, the reference may be a direct reference, where the first object stores an identifier (e.g. foreign key, etc.) to the second object. As another option, the reference may be an indirect reference, where the first object stores an identifier to a third object (i.e. intervening object), and the third object stores the identifier of the second object.

To this end, the relationship between the first object and the second object may optionally include a parent-child relationship (e.g. the first object is a child of the parent second object). As another option, the relationship between the first object and the second object may include a child-parent relationship (e.g. the first object is a parent of the child second object). As yet another option, the relationship between the first object and the second object may be a child-child relationship (e.g. the first object and the second object are related to a same parent object).

In one embodiment, the second object may be indicated by the rule. For example, the rule may indicate the second action that may be taken (i.e. as a result of the evaluation of the rule) and an identifier of the second object upon which the second action may be taken. In another embodiment, the second object may be indicated in association with the second action. For example, the rule may include an indicator of the second action that may be taken, and the second action may include an identifier of the second object upon which the second action may be taken. In this way, the action and/or identifier of the second object may be included in the rule or referenced by the rule.

Still yet, the second action may be performed based on the evaluation of the rule, such that a first output from the evaluation of the rule may result in the second action not being performed, whereas a second output from the evaluation of the rule may result in the second action being performed. In one embodiment, the second action may be performed in response to the evaluation indicating that the rule is met (e.g. the rule is evaluated to true). In another embodiment, the second action may not necessarily be performed in response to the evaluation indicating that the rule is not met (e.g. the rule is evaluated to false).

It should be noted that the second action may include any operation capable of being performed in association with the second object. In one embodiment, the second action may include an operation performed on the object. Optionally, the second action may include updating the second object (e.g. a field of the second object). In another embodiment, the second action may include updating the second object with a predetermined value. For example, the second action may include updating a field of the second object with a value indicated by the rule, where such field is also indicated by the rule.

In another embodiment, the second action may include an operation performed with respect to the second object. For example, the second action may include sending an electronic mail message (email) (e.g. indicating the change to the first object and any effect thereof on the second object, etc.). As another example, if the first object is a contact and the first action performed in association with the first object includes creating the contact, then the second action may include emailing the contact via an account (i.e. the second object) under which the contact was created. As yet another example, if the first object is a sales order object which is created, then the second action may include updating a type of a related account object (second object) from an opportunity type to a customer type.

To this end, actions on objects may be performed according to rules associated with their related objects, when an action occurs with respect to such related objects. This may allow an action associated with an object to be automatically performed when an action associated with a related object is performed. In addition, by using rules to configure the actions to be taken on related objects in the manner described above, manually coding each individual object to perform the related object actions may be avoided.

Figure 2:
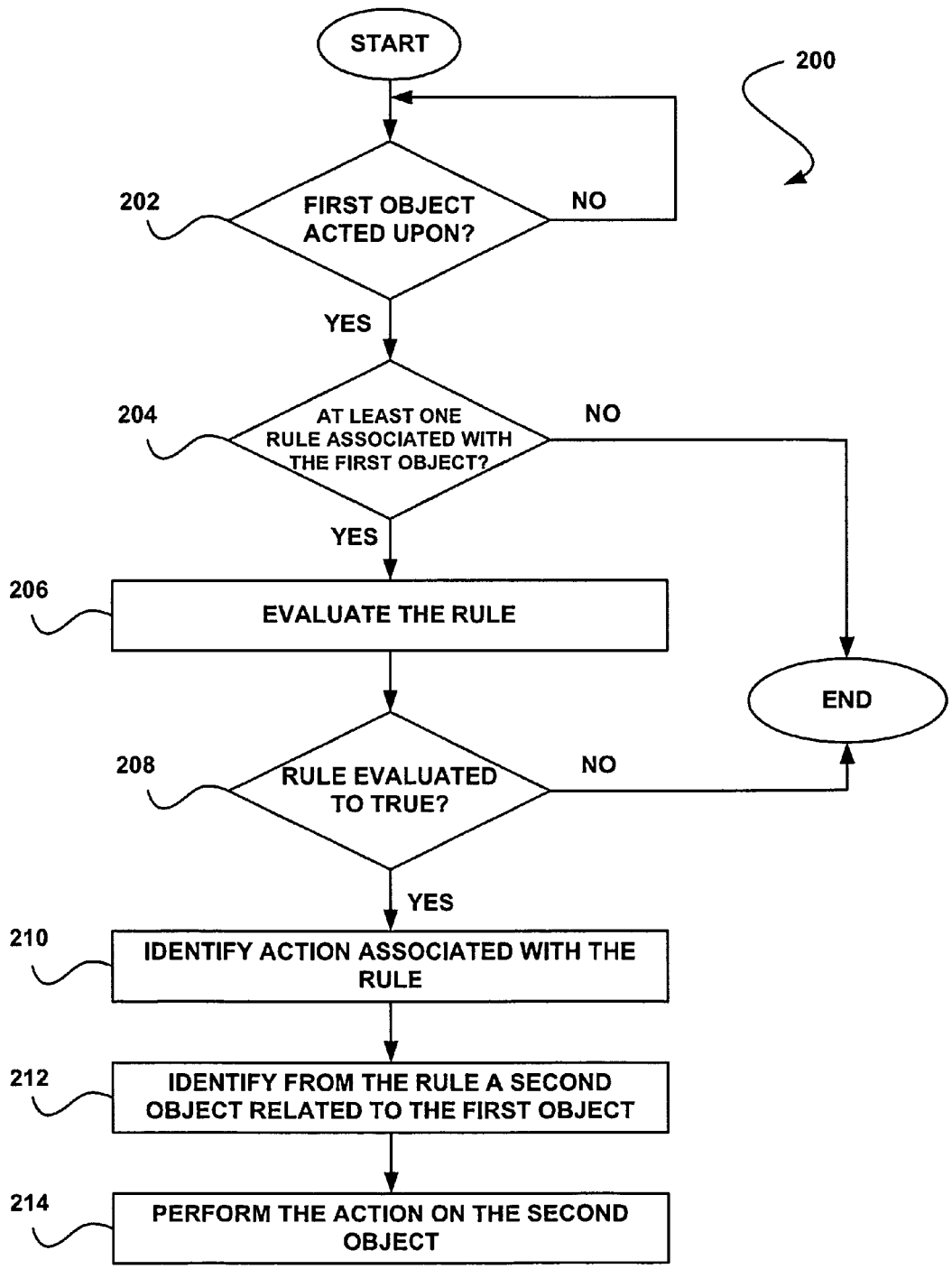
FIG. 2 illustrates a method for performing an action on an object as an automatic response to an update to a related object, in accordance with an embodiment.

FIG. 2 illustrates a method 200 for performing an action on an object as an automatic response to an update to a related object, in accordance with an embodiment. As an option, the present method 200 may be carried out in the context of the functionality of FIG. 1. Of course, however, the method 200 may be carried out in any desired environment. The aforementioned definitions may apply during the present description.

As shown in decision 202, it is determined whether a first object has been acted upon. For example, it may be determined whether any modification has been made to the first object, whether the first object has been created, whether the first object has been deleted, etc. In one embodiment, the action on the first object may be initiated by a user.

If it is determined that the first object has not been acted upon, the method 200 continues to wait for a first object to be acted upon. However, once a first object is acted upon, it is further determined whether at least one rule is associated with the first object. Note decision 204. In the present embodiment, the rule may include a particular type of rule, namely a rule for automatically acting upon related objects. Thus, in one embodiment, the determination may be made by determining whether the first object stores any references to rules, for example, which would be stored in a predetermined field of the object. As an option, decision 204 may only be performed if permission to act upon related objects via the first object is enabled (e.g. for the tenant initiating the action on the first object).

If it is determined that the first object does not have at least one rule associated therewith, the method 200 terminates. In this way, the first object may be acted upon without necessarily any further actions being automatically taken. If it is determined that the first object does have at least one rule associated therewith, the rule is evaluated. Note operation 206.

In one embodiment, a condition included in the rule may be evaluated. Such condition may relate to the portion of the first object which was acted upon. To this end, it is determined whether the rule evaluated to true, as shown in decision 208.

If it is determined that the rule did not evaluate to true, the method 200 ends. Of course, it should be noted that in another embodiment, any default action may be performed when the rule evaluates to false. On the other hand, if it is determined that the rule did evaluate to true, an action associated with the rule is identified. Note operation 210. The action may be stored in the rule or referenced by the rule. Just by way of example, the rule may state that "if . . . then . . . " where the "if" statement is the rule and the "then" statement is the action.

Moreover, a second object related to the first object is identified from the rule, as shown in operation 212. In one embodiment, the rule may store an identifier of the second object or reference the identifier of the second object. In another embodiment, the action (i.e. included in the rule or referenced by the rule) may include the indicator of the second object. In the example above with respect to the "if . . . then . . . " statement, the second object may be identified from the "then" statement, where the "then" statement includes "then . . . on . . . " with "on . . . " indicating the second object.

The action is then performed on the second object, as shown in operation 214. In this way, preconfigured actions may be automatically performed on objects when their related objects have been acted upon, by virtue of rules configured for the acted upon objects. In a similar manner, once the action is performed on the second object, the method 200 may be repeated for the second object.

Figure 3:
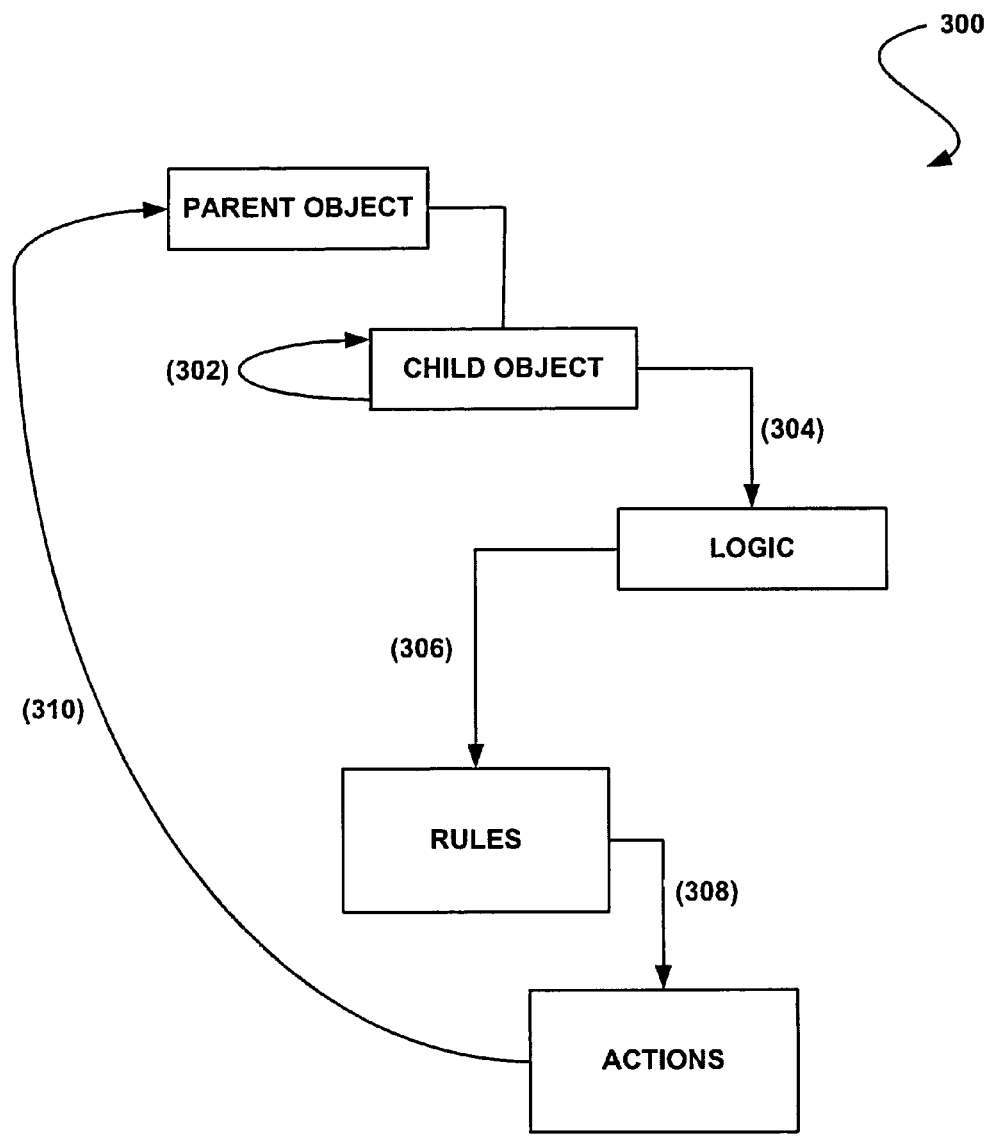
FIG. 3 illustrates a database system for rule-based performance of actions on related objects, in accordance with an embodiment.

FIG. 3 illustrates a database system 300 for rule-based performance of actions on related objects, in accordance with an embodiment. As an option, the database system 300 may be implemented in the context of the functionality of FIGS. 1-2. Of course, however, the database system 300 may be implemented in any desired environment. Again, the aforementioned definitions may apply during the present description.

The database system 300 may include at least one database of a multi-tenant on-demand system in one embodiment. Accordingly, the components shown in the database system 300 (e.g. the parent object, child object, rules, and/or actions) may include components of a single database or multiple databases. Similarly, the components may be stored in a single table or multiple tables of the database(s).

As shown, a master object is related to a child object. In the present embodiment, the parent/child objects may include any of the combinations shown below in Table 1. Of course, it should be noted that such object types are set forth for illustrative purposes only, and thus should not be construed as limiting in any manner.

TABLE 1

1. Opportunity-to-Account
2. Opportunity-to-Opportunity
3. Contact-to-Account
4. Custom-to-Standard Of course, it should be noted that while a parent/child relationship between objects is shown, the relationship may include any type of relationship between objects. Initially, the child object is acted upon (operation 302). In response, logic is executed (operation 304) to evaluate rules associated with the child object (operation 306). Based on the evaluation of the rules, actions are performed (operation 308).

In the embodiment shown, the actions are referenced by the rules (e.g. in a separate table, etc.). Of course, in other embodiments the actions may be stored by the rules. The actions may be performed if the rules evaluate to true. In particular, if a rule evaluates to true, the action associated with such rule may be performed. As further shown, the actions are performed on the parent object (operation 310). In this way, acting upon a child object may automatically result in an action being performed on the parent object, according to rules configured for the child object.

Figure 4A:
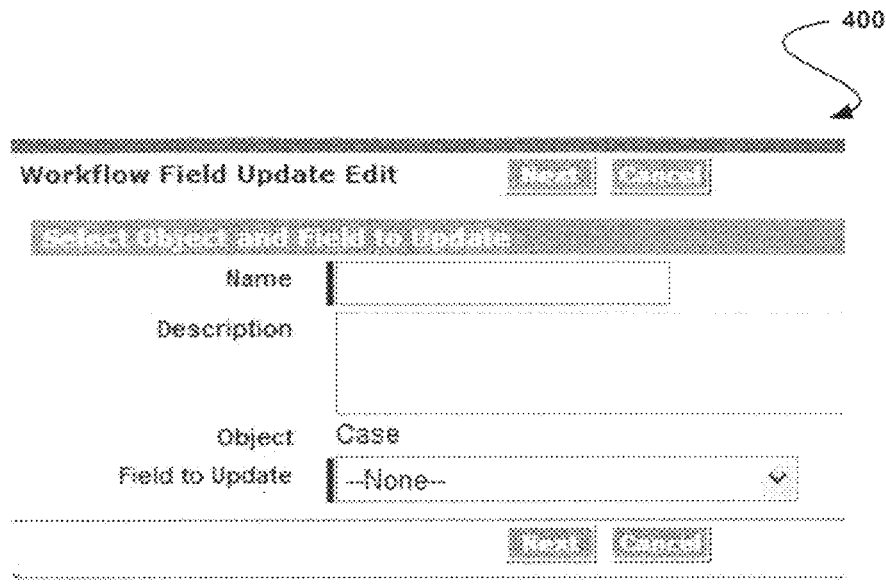
FIGS. 4A-4C illustrate graphical user interfaces (GUIs) for configuring rules used for rule-based performance of actions on related objects, in accordance with an embodiment.
Figure 4B:
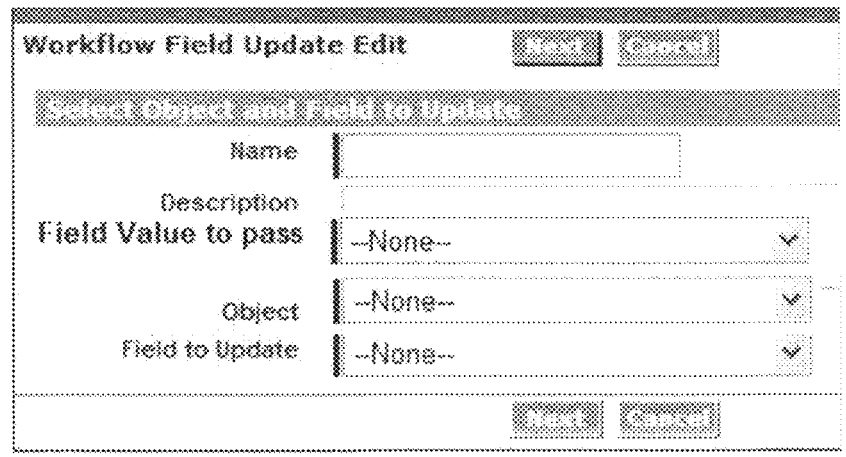
Figure 4C:
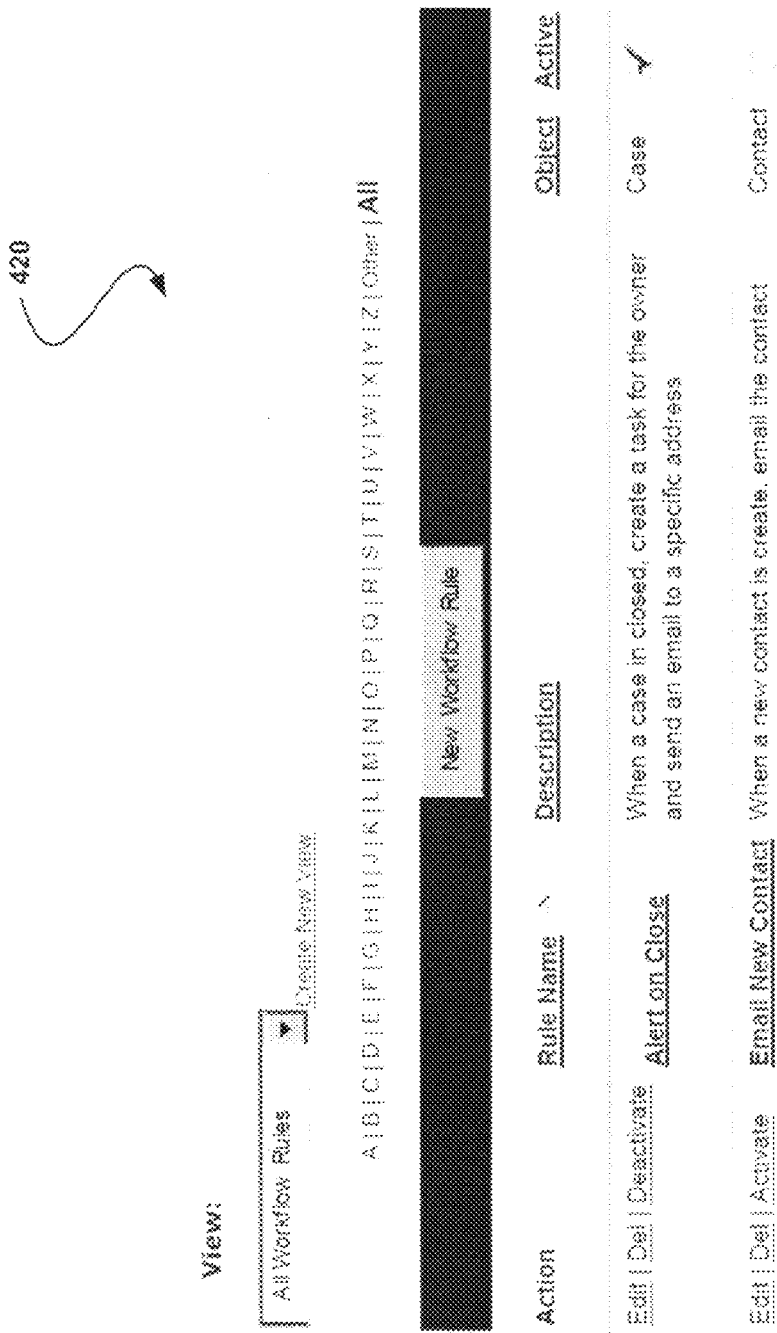

FIGS. 4A-4C illustrate GUIs 400-430 for configuring rules used for rule-based performance of actions on related objects, in accordance with an embodiment. As an option, the GUIs 400-430 may be implemented in the context of the functionality of FIGS. 1-3. Of course, however, the GUIs 400-430 may be implemented in any desired environment. Yet again, the aforementioned definitions may apply during the present description.

In FIG. 4A, a GUI 400 is provided for configuring a rule associated with a first object for use in acting upon a related second object. Thus, the GUI 400 may optionally be displayed via an option associated with the first object. For example, a user may be required to view at least one GUI associated with the first object to access the present GUI 400 for configuring the rule in association with the first object.

As shown, the GUI 400 includes a name field for entering a name of the rule, a description field for entering a textual description of the rule, and a field to update field for entering an identifier of a field of the second object to be updated according to the rule. The identifier of the related second object may be hard coded into the GUI 400, such that a user may not necessarily be capable of using the GUI 400 to select or enter an identifier of the second object. For example, the present GUI 400 may be used when the first object is only related to a single second object.

Upon selection of the next option presented on the GUI 400, an expression included in the rule may be configured. For example, a condition of the rule may be configured. In addition, an action to be performed on the selected field of the object (described above), based upon an evaluation, may be configured.

In FIG. 4B, a GUI 410 is shown which is substantially similar to the GUI 400 of FIG. 4A. However, the GUI 410 includes an option to select the second object on which the action may be performed. For example, the GUI 410 may be used when multiple objects from which the user may select are related to the first object. The GUI 410 also includes a field to pass field for selecting a field of the first object the value of which is to be passed to the second object (i.e. based an evaluation of the rule). Just by way of example, if the first object is a case object which is a child object of a contact object, the GUI 410 may be used to configure a rule to pass a contact field of the case object to a contact field of the contact record (e.g. when the contact record of the case object is updated).

In FIG. 4C, the GUI 420 displays a list view of rules associated with objects that are configured for acting upon related objects. As shown, for each configured rule the GUI 420 displays a name of the rule, a description of the rule, the object for which the rule is configured (i.e. the first object described above), and an indicator of whether the rule is active (i.e. permissions are set for the rule). The GUI 420 may be used for editing the rules, deleting the rules, and/or deactivating the rules (i.e. removing permissions for the rules).

System Overview

Figure 5:
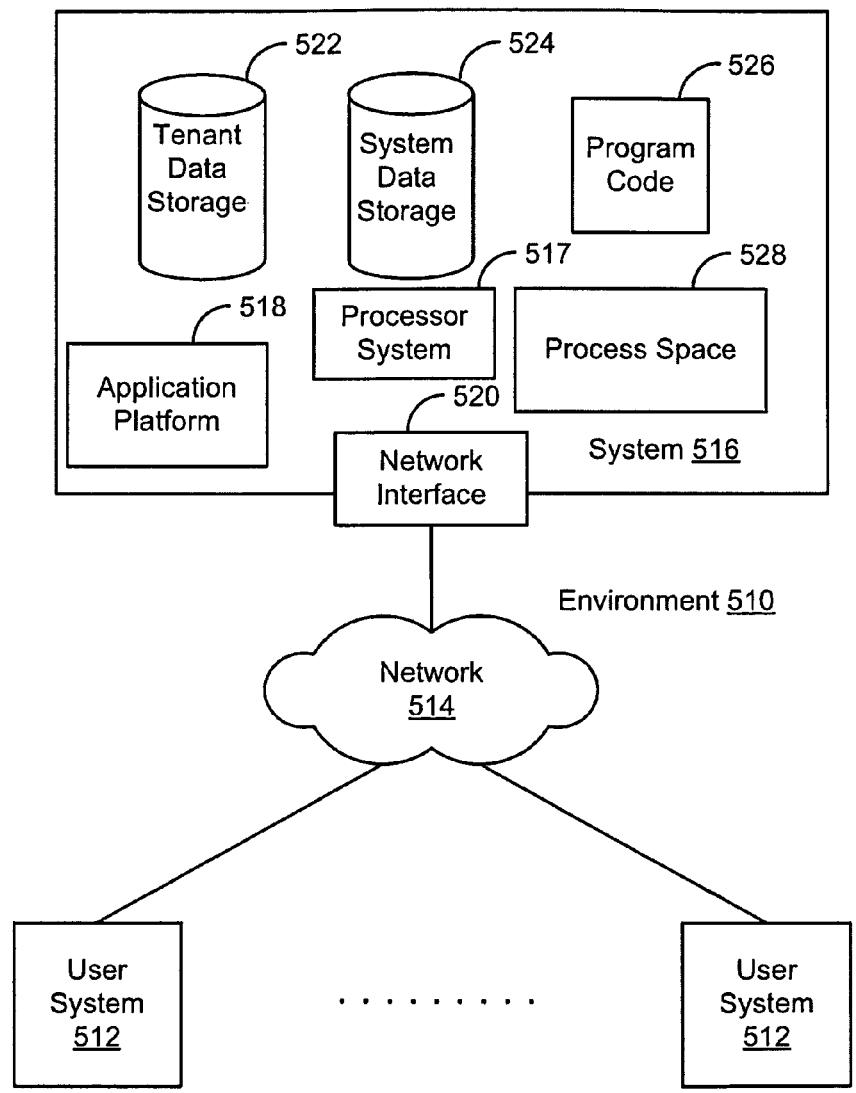
FIG. 5 illustrates a block diagram of an example of an environment wherein an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application (s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
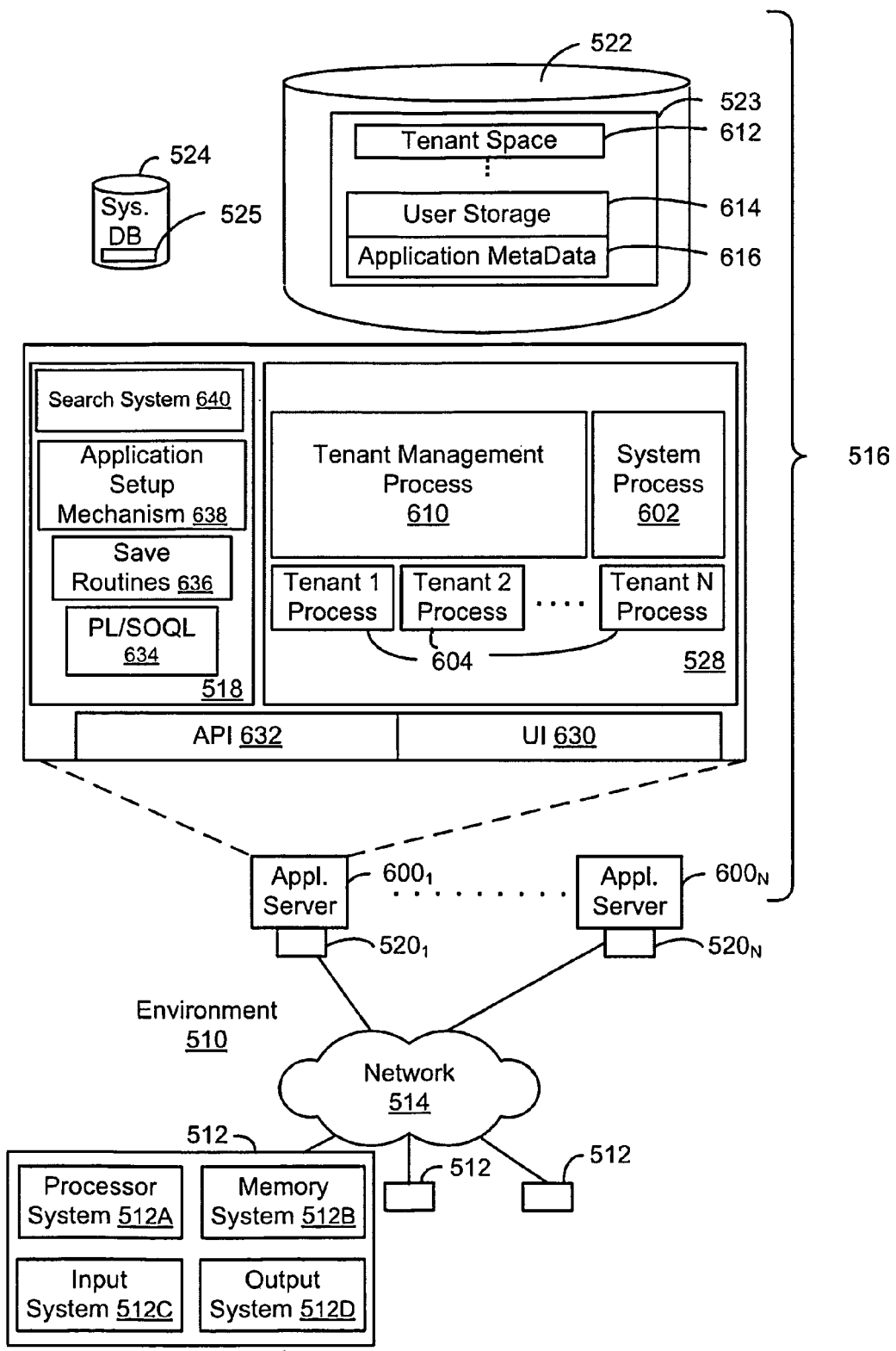
FIG. 6 illustrates a block diagram of an embodiment of elements of FIG. 5 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, which when executed implements a method for rule-based performance of actions on related objects, the method comprising:

providing a first graphical user interface (GUI) associated with a first object and having an option for configuring at least one rule associated with the first object, the configuring including inputting one or more characteristics of the at least one rule;

receiving via the first GUI a selection of the option for configuring the at least one rule associated with the first object;

providing a second GUI associated with the option for configuring the at least one rule associated with the first object in response to the selection of the option for configuring the at least one rule, where the second GUI includes for each of the at least one rule:

a name field for entering a name of the rule, a description field for entering a textual description of the rule, a field to update field for entering an identifier of a field of a second object to be updated according to the rule, where the second object is related to the first object, and a field to pass field for selecting a field of the first object such that the value of the field is passed to the second object based on an evaluation of the rule;

receiving via the second GUI a configuration of the at least one rule associated with the first object;

creating the at least one rule associated with the first object, based on the received configuration;

storing the created at least one rule in association with the first object;

identifying a first action performed on the first object;

identifying the at least one rule stored in association with the first object when the first action is performed on the first object;

evaluating the identified at least one rule associated with the first object; and conditionally performing at least one second action associated with the second object related to the first object, based on the evaluation of the at least one rule.

2. The computer program product of claim 1, wherein the first object includes a row of a database.

3. The computer program product of claim 2, wherein the database is of a multi-tenant on-demand database system.

4. The computer program product of claim 1, wherein the first action includes an update to the first object.

5. The computer program product of claim 1, wherein the at least one rule includes an expression.

6. The computer program product of claim 1, wherein the at least one rule is specific to a field of the first object associated with the update.

7. The computer program product of claim 1, wherein the at least one rule is evaluated automatically in response to the first action.

8. The computer program product of claim 1, wherein evaluating the at least one rule includes determining whether a condition of the at least one rule is met.

9. The computer program product of claim 8, wherein the at least one second action is performed in response to the evaluation indicating that the at least one rule is met.

10. The computer program product of claim 1, wherein the at least one second action is indicated by the at least one rule.

11. The computer program product of claim 1, wherein the second object is related to the first object by virtue of the second object being referenced by the first object.

12. The computer program product of claim 11, wherein the reference includes a direct reference.

13. The computer program product of claim 11, wherein the reference includes an indirect reference.

14. The computer program product of claim 1, wherein the at least one second action includes updating the second object.

15. The computer program product of claim 14, wherein the at least one second action includes updating the field of the second object indicated by the at least one rule with a value indicated by the at least one rule.

16. The computer program product of claim 1, wherein the indirect reference is established by the first object storing an identifier to a third object and the third object storing an identifier of the second object.

17. The computer program product of claim 1, wherein the second object is related to the first object by the first object and the second object being children of a common parent object.

18. The computer program product of claim 1, wherein the first action includes a change to the first object, and wherein the at least one second action includes sending an electronic mail message indicating the change to the first object and an effect on the second object of the change to the first object.

19. The computer program product of claim 1, wherein storing the at least one rule in association with the first object includes storing a reference to the at least one rule in a predetermined field of the first object.

20. The computer program product of claim 1, wherein the one or more characteristics include a condition of the rule.

21. A method, comprising:
providing a first graphical user interface (GUI) associated with a first object and having an option for configuring at least one rule associated with the first object;
receiving via the first GUI a selection of the option for configuring the at least one rule associated with the first object, the configuring including inputting one or more characteristics of the at least one rule;
providing a second GUI associated with the option for configuring the at least one rule associated with the first object in response to the selection of the option for configuring the at least one rule, where the second GUI includes for each of the at least one rule:
a name field for entering a name of the rule,
a description field for entering a textual description of the rule,
a field to update field for entering an identifier of a field of a second object to be updated according to the rule, where the second object is related to the first object, and
a field to pass field for selecting a field of the first object such that the value of the field is passed to the second object based on an evaluation of the rule;
receiving via the second GUI a configuration of the at least one rule associated with the first object;
creating the at least one rule associated with the first object, based on the received configuration;
storing the at least one rule in association with the first object;
identifying a first action performed on the first object;
identifying the at least one rule stored in association with the first object when the first action is performed on the first object;
evaluating the identified at least one rule associated with the first object; and
conditionally performing at least one second action associated with the second object related to the first object, based on the evaluation of the at least one rule.

22. An apparatus, comprising:
a processor for:
providing a first graphical user interface (GUI) associated with a first object and having an option for configuring at least one rule associated with the first object, the configuring including inputting one or more characteristics of the at least one rule;
receiving via the first GUI a selection of the option for configuring the at least one rule associated with the first object;
providing a second GUI associated with the option for configuring the at least one rule associated with the first object in response to the selection of the option for configuring the at least one rule, where the second GUI includes for each of the at least one rule:
a name field for entering a name of the rule,
a description field for entering a textual description of the rule,
a field to update field for entering an identifier of a field of a second object to be updated according to the rule, where the second object is related to the first object, and
a field to pass field for selecting a field of the first object such that the value of the field is passed to the second object based on an evaluation of the rule;
receiving via the second GUI a configuration of the at least one rule associated with the first object;
creating the at least one rule associated with the first object, based on the received configuration;
storing the at least one rule in association with the first object;
identifying a first action performed on the first object;
identifying the at least one rule stored in association with the first object when the first action is performed on the first object;
evaluating the identified at least one rule associated with the first object; and conditionally performing at least one second action associated with the second object related to the first object, based on the evaluation of the at least one rule.

23. A method for transmitting code, comprising:

transmitting code to provide a first graphical user interface (GUI) associated with a first object and having an option for configuring at least one rule associated with the first object, the configuring including inputting one or more characteristics of the at least one rule;

transmitting code to receive via the first GUI a selection of the option for configuring the at least one rule associated with the first object;

transmitting code to provide a second GUI associated with the option for configuring the at least one rule associated with the first object;

transmitting code to receive via the second GUI a configuration of the at least one rule associated with the first object in response to the selection of the option for configuring the at least one rule, where the second GUI includes for each of the at least one rule:

a name field for entering a name of the rule, a description field for entering a textual description of the rule, a field to update field for entering an identifier of a field of a second object to be updated according to the rule, where the second object is related to the first object, and a field to pass field for selecting a field of the first object such that the value of the field is passed to the second object based on an evaluation of the rule;

transmitting code to create the at least one rule associated with the first object, based on the received configuration;

transmitting code to store the at least one rule in association with the first object;

transmitting code to identify a first action performed on the first object;

transmitting code to identify the at least one rule stored in association with the first object when the first action is performed on the first object;

transmitting code to evaluate the identified at least one rule associated with the first object; and transmitting code to conditionally perform at least one second action associated with the second object related to the first object, based on the evaluation of the at least one rule.

* * * * *